US010001613B2

(12) United States Patent
Varkey et al.

(10) Patent No.: US 10,001,613 B2
(45) Date of Patent: Jun. 19, 2018

(54) METHODS AND CABLES FOR USE IN FRACTURING ZONES IN A WELL

(71) Applicant: Schlumberger Technology Corporation, Sugar Land, TX (US)

(72) Inventors: Joseph Varkey, Missouri City, TX (US); Paul Wanjau, Missouri City, TX (US); David Kim, Stafford, TX (US); Maria Grisanti, Missouri City, TX (US); Sheng Chang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 292 days.

(21) Appl. No.: 14/628,732

(22) Filed: Feb. 23, 2015

(65) Prior Publication Data

US 2016/0025945 A1 Jan. 28, 2016

Related U.S. Application Data

(60) Provisional application No. 62/027,696, filed on Jul. 22, 2014.

(51) Int. Cl.
*G02B 6/44* (2006.01)
*H01B 3/30* (2006.01)
(Continued)

(52) U.S. Cl.
CPC ............ *G02B 6/4416* (2013.01); *E21B 43/26* (2013.01); *E21B 47/065* (2013.01); *H01B 3/30* (2013.01);
(Continued)

(58) Field of Classification Search
CPC ..... G02B 6/4427; G02B 6/4416; E21B 43/26; E21B 43/261; E21B 33/138; E21B 47/065; E21B 49/006
See application file for complete search history.

(56) References Cited

U.S. PATENT DOCUMENTS 3,316,967 A 5/1967 Huitt
4,051,900 A 10/1977 Hankins
(Continued)

FOREIGN PATENT DOCUMENTS

GB 2007745 A 5/1979
GB 2197364 A 5/1988
(Continued)

OTHER PUBLICATIONS

International Search Report issued in International Patent Application No. PCT/US2015/041220 dated Oct. 8, 2015; 3 pages.
(Continued)

*Primary Examiner* — Jennifer H Gay
(74) *Attorney, Agent, or Firm* — Sara K. M. Hinkley

(57) ABSTRACT

A cable having a cable core for use in fracturing zones in a well, wherein the cable core includes an optical fiber conductor. The optical fiber conductor has a pair of half-shell conductors. An insulated optical fiber located between the pair of half-shell conductors. The insulated optical fiber is coupled with the pair of half-shell conductors. An optical fiber conductor jacket is disposed about the pair of half-shell conductors.

6 Claims, 6 Drawing Sheets

(51) Int. Cl.
*H01B 3/47* (2006.01)
*E21B 43/26* (2006.01)
*E21B 47/06* (2012.01)
*H01B 7/04* (2006.01)
*H01B 9/00* (2006.01)
*G02B 6/50* (2006.01)

(52) U.S. Cl.
CPC .............. *H01B 3/47* (2013.01); *H01B 7/046* (2013.01); *G02B 6/443* (2013.01); *G02B 6/504* (2013.01); *H01B 9/005* (2013.01)

(56) References Cited

U.S. PATENT DOCUMENTS

| | | | |
|---|---|---|---|
| 4,102,401 A | 7/1978 | Erbstoesser | |
| 4,422,718 A * | 12/1983 | Nakagome | G02B 6/4427 174/70 R |
| 4,504,112 A * | 3/1985 | Gould | G02B 6/4436 219/121.63 |
| 4,716,964 A | 1/1988 | Erbstoesser et al. | |
| 4,832,121 A * | 5/1989 | Anderson | E21B 43/26 166/250.09 |
| 4,848,467 A | 7/1989 | Cantu et al. | |
| 4,867,241 A | 9/1989 | Strubhar | |
| 4,938,286 A * | 7/1990 | Jennings, Jr. | E21B 43/261 166/280.1 |
| 4,951,751 A * | 8/1990 | Jennings, Jr. | C09K 8/60 166/270 |
| 4,957,165 A | 9/1990 | Cantu et al. | |
| 4,986,355 A | 1/1991 | Casad et al. | |
| 5,295,393 A | 3/1994 | Thiercelin | |
| 5,463,711 A * | 10/1995 | Chu | G02B 6/4427 174/70 R |
| 5,862,861 A | 1/1999 | Kalsi | |
| 5,979,557 A | 11/1999 | Card et al. | |
| 6,006,838 A | 12/1999 | Whiteley et al. | |
| 6,060,662 A * | 5/2000 | Rafie | E21B 17/206 174/106 R |
| 6,070,666 A * | 6/2000 | Montgomery | E21B 43/26 166/281 |
| 6,239,183 B1 | 5/2001 | Farmer et al. | |
| 6,278,825 B1 * | 8/2001 | Casiraghi | G02B 6/4422 385/100 |
| 6,392,151 B1 * | 5/2002 | Rafie | E21B 17/206 174/106 R |
| 6,399,546 B1 | 6/2002 | Chang et al. | |
| 6,404,961 B1 * | 6/2002 | Bonja | E21B 17/00 385/109 |
| 6,435,277 B1 | 8/2002 | Qu et al. | |
| 6,506,710 B1 | 1/2003 | Hoey et al. | |
| 6,543,538 B2 | 4/2003 | Tolman et al. | |
| 6,588,266 B2 * | 7/2003 | Tubel | E21B 23/03 250/255 |
| 6,667,280 B2 | 12/2003 | Chang et al. | |
| 6,703,352 B2 | 3/2004 | Dahayanake et al. | |
| 6,903,054 B2 | 6/2005 | Fu et al. | |
| 6,907,936 B2 | 6/2005 | Fehr et al. | |
| 6,949,491 B2 | 9/2005 | Cooke, Jr. | |
| 7,036,587 B2 | 5/2006 | Munoz, Jr. et al. | |
| 7,051,812 B2 | 5/2006 | McKee et al. | |
| 7,060,661 B2 | 6/2006 | Dobson, Sr. et al. | |
| 7,267,170 B2 | 9/2007 | Mang et al. | |
| 7,303,018 B2 | 12/2007 | Cawiezel et al. | |
| 7,380,600 B2 | 6/2008 | Willberg et al. | |
| 7,380,602 B2 | 6/2008 | Brady et al. | |
| 7,496,258 B1 | 2/2009 | Varkey | |
| 7,506,689 B2 | 3/2009 | Surjaatmadja et al. | |
| 7,510,009 B2 | 3/2009 | Cawiezel et al. | |
| 7,565,929 B2 | 7/2009 | Bustos et al. | |
| 7,775,278 B2 | 8/2010 | Willberg et al. | |
| 7,784,541 B2 | 8/2010 | Hartman et al. | |
| 7,836,952 B2 | 11/2010 | Fripp | |
| 7,845,413 B2 | 12/2010 | Shampine et al. | |
| 7,860,362 B2 * | 12/2010 | Varkey | G02B 6/443 385/101 |
| 7,912,333 B2 * | 3/2011 | Varkey | G02B 6/4427 385/101 |
| 8,016,034 B2 | 9/2011 | Glasbergen et al. | |
| 8,109,335 B2 | 2/2012 | Luo et al. | |
| 8,167,043 B2 | 5/2012 | Willberg et al. | |
| 8,286,703 B2 | 10/2012 | Clapp et al. | |
| 8,726,991 B2 | 5/2014 | Boney | |
| 8,905,133 B2 | 12/2014 | Potapenko et al. | |
| 9,033,041 B2 | 5/2015 | Baihly et al. | |
| 9,201,207 B2 * | 12/2015 | Varkey | E21B 47/123 |
| 2001/0050172 A1 | 12/2001 | Tolman et al. | |
| 2004/0045705 A1 | 3/2004 | Gardner et al. | |
| 2005/0056418 A1 | 3/2005 | Nguyen | |
| 2005/0279501 A1 | 12/2005 | Surjaatmadja et al. | |
| 2006/0045442 A1 | 3/2006 | Varkey et al. | |
| 2006/0102342 A1 * | 5/2006 | East | E21B 43/26 166/250.1 |
| 2006/0113077 A1 * | 6/2006 | Willberg | C09K 8/42 166/280.1 |
| 2006/0118301 A1 | 6/2006 | East et al. | |
| 2006/0175059 A1 | 8/2006 | Sinclair et al. | |
| 2006/0185848 A1 | 8/2006 | Surjaatmadja et al. | |
| 2006/0225881 A1 * | 10/2006 | O'Shaughnessy | E21B 47/01 166/250.17 |
| 2006/0231286 A1 | 10/2006 | Varkey | |
| 2006/0280412 A1 | 12/2006 | Varkey | |
| 2007/0029086 A1 | 2/2007 | East | |
| 2007/0125163 A1 | 6/2007 | Dria et al. | |
| 2007/0169935 A1 | 7/2007 | Akbar et al. | |
| 2007/0215345 A1 * | 9/2007 | Lafferty | E21B 47/011 166/250.1 |
| 2007/0284109 A1 | 12/2007 | East et al. | |
| 2008/0000638 A1 | 1/2008 | Burukhin et al. | |
| 2008/0031578 A1 * | 2/2008 | Varkey | E21B 47/123 385/100 |
| 2008/0047707 A1 * | 2/2008 | Boney | E21B 34/063 166/270 |
| 2008/0053657 A1 | 3/2008 | Alary et al. | |
| 2008/0056639 A1 | 3/2008 | MacDougall et al. | |
| 2008/0066910 A1 | 3/2008 | Alary et al. | |
| 2008/0078548 A1 | 4/2008 | Pauls et al. | |
| 2008/0093073 A1 | 4/2008 | Bustos et al. | |
| 2008/0156498 A1 | 7/2008 | Phi et al. | |
| 2008/0196896 A1 | 8/2008 | Bustos et al. | |
| 2008/0210423 A1 * | 9/2008 | Boney | C09K 8/68 166/281 |
| 2008/0280788 A1 | 11/2008 | Parris et al. | |
| 2008/0280790 A1 | 11/2008 | Mirakyan et al. | |
| 2008/0289851 A1 * | 11/2008 | Varkey | G02B 6/4416 174/115 |
| 2009/0025934 A1 | 1/2009 | Hartman et al. | |
| 2009/0032258 A1 | 2/2009 | Chang et al. | |
| 2009/0046983 A1 * | 2/2009 | Varkey | G02B 6/443 385/113 |
| 2009/0054269 A1 | 2/2009 | Chatterji et al. | |
| 2009/0062154 A1 | 3/2009 | Windebank et al. | |
| 2009/0145610 A1 * | 6/2009 | Varkey | E21B 17/206 166/335 |
| 2009/0178807 A1 | 7/2009 | Kaufman et al. | |
| 2009/0196557 A1 * | 8/2009 | Varkey | G02B 6/4427 385/101 |
| 2009/0218094 A1 | 9/2009 | McLeod et al. | |
| 2009/0283258 A1 | 11/2009 | Poitzsch et al. | |
| 2010/0116510 A1 * | 5/2010 | Varkey | E21B 47/123 166/385 |
| 2010/0155058 A1 * | 6/2010 | Gordy | E21B 47/101 166/250.1 |
| 2010/0212906 A1 | 8/2010 | Fulton et al. | |
| 2010/0267591 A1 | 10/2010 | Todd et al. | |
| 2011/0075978 A1 * | 3/2011 | Rose | H01B 3/302 385/102 |
| 2011/0090496 A1 * | 4/2011 | Samson | E21B 47/065 356/301 |
| 2011/0284214 A1 * | 11/2011 | Ayoub | E21B 43/26 166/177.5 |
| 2012/0048570 A1 | 3/2012 | Hansen | |

(56) References Cited

U.S. PATENT DOCUMENTS

| | | | |
|---|---|---|---|
| 2012/0085531 | A1 | 4/2012 | Leising et al. |
| 2012/0168163 | A1 | 7/2012 | Bertoja et al. |
| 2012/0181034 | A1 | 7/2012 | Bour et al. |
| 2012/0217014 | A1 | 8/2012 | Groves |
| 2012/0285692 | A1 | 11/2012 | Potapenko et al. |
| 2013/0062063 | A1 | 3/2013 | Baihly et al. |
| 2013/0220604 | A1* | 8/2013 | El-Rabaa ............. E21B 49/006 166/259 |
| 2013/0233537 | A1* | 9/2013 | McEwen-King ....... E21B 43/26 166/250.1 |
| 2013/0264054 | A1 | 10/2013 | East et al. |
| 2013/0264056 | A1 | 10/2013 | Stout |
| 2013/0270011 | A1 | 10/2013 | Akkurt et al. |
| 2013/0272898 | A1* | 10/2013 | Toh ..................... F04D 15/00 417/44.1 |
| 2014/0014371 | A1 | 1/2014 | Jacob et al. |
| 2014/0083682 | A1* | 3/2014 | Grigsby ................ E21B 43/04 166/250.01 |
| 2014/0096950 | A1* | 4/2014 | Pyecroft ............... E21B 43/26 166/247 |
| 2014/0138087 | A1 | 5/2014 | Gupta |
| 2014/0144224 | A1 | 5/2014 | Hoffman et al. |
| 2014/0144226 | A1 | 5/2014 | Shanks |
| 2014/0196893 | A1 | 7/2014 | Vigneaux |
| 2014/0202708 | A1 | 7/2014 | Jacob et al. |
| 2014/0241677 | A1* | 8/2014 | Sutehall ............... G02B 6/4433 385/104 |
| 2014/0358444 | A1 | 12/2014 | Friehauf et al. |
| 2014/0367121 | A1* | 12/2014 | Varkey ................. E21B 47/123 166/385 |
| 2015/0041132 | A1 | 2/2015 | Nelson et al. |
| 2015/0120194 | A1* | 4/2015 | Chen .................... E21B 47/00 702/6 |
| 2015/0122541 | A1 | 5/2015 | Varkey et al. |
| 2015/0129229 | A1 | 5/2015 | Ring et al. |
| 2015/0144347 | A1 | 5/2015 | Brannon et al. |
| 2015/0170799 | A1* | 6/2015 | Varkey ................. G02B 6/4416 174/70 R |
| 2015/0292293 | A1* | 10/2015 | Tolman ................ E21B 33/138 166/250.01 |
| 2015/0294763 | A1* | 10/2015 | Varkey ................. H01B 7/046 385/101 |
| 2015/0369023 | A1* | 12/2015 | MacPhail ............. E21B 43/12 166/269 |
| 2016/0024902 | A1* | 1/2016 | Richter ................ E21B 47/065 166/250.01 |
| 2016/0025945 | A1* | 1/2016 | Wanjau ................ H01B 7/046 166/250.1 |
| 2016/0123126 | A1* | 5/2016 | Portman ............... E21B 43/26 166/250.01 |
| 2016/0146962 | A1* | 5/2016 | Hayward ............. E21B 43/26 166/250.1 |
| 2016/0177693 | A1* | 6/2016 | Gomaa ................ E21B 43/267 166/250.07 |
| 2016/0222736 | A1* | 8/2016 | Varkey ................. G02B 6/4427 |
| 2016/0333680 | A1 | 11/2016 | Richter et al. |
| 2017/0145298 | A1 | 5/2017 | Huang et al. |

FOREIGN PATENT DOCUMENTS

| | | |
|---|---|---|
| WO | WO2006014951 A2 | 2/2006 |
| WO | WO2009088317 A1 | 7/2009 |
| WO | WO2012058296 A2 | 5/2012 |
| WO | WO2012170382 A1 | 12/2012 |
| WO | WO2013009773 A1 | 1/2013 |
| WO | WO2013112811 A1 | 8/2013 |
| WO | WO2014099207 A1 | 6/2014 |
| WO | WO2015061655 A2 | 4/2015 |
| WO | WO2016076747 A2 | 4/2015 |

OTHER PUBLICATIONS

Written Opinion issued in International Patent Application No. PCT/US2015/041220 dated Oct. 8, 2015; 7 pages.

Albertsson et al., "Aliphatic Polyesters: Synthesis, Properties and Applications", Advances in Polymer Science: Degradable Aliphatic Polyesters, 2002, pp. 1-40, vol. 157.

Arguijo et al., "Streamlined Completions Process: An Eagle Ford Shale Case History", SPE 162658, 2012 SPE Canadian Unconventional Resources Conference, Oct. 30-Nov. 1, 2012, 17 pages.

Aviles et al., Application and Benefits of Degradable Technology in Open-hole Fracturing, SPE 166528, SPE Annual Technical Conference and Exhibition, Sep. 30-Oct. 2, 2013, 9 pages.

Badri, M., Dare, D., Rodda, J., Thiesfield, G., Blauch, M. Key to the Success Application of Hydraulic Fracturing in an Emerging Coalbed Methane Prospect—An Example from the Peat Coals of Australia. 2000, SPE-64493. (16 pages).

Bartko, K.M., Conway, M.W., Krawietz, T.E., Marquez, R.B., Oba, R.G.M. Field and laboratory experience in closed fracture acidizing the Lisburne field, Prudhoe Bay, Alaska. 1992, SPE 24855. (9 pages).

Bell, C.E., Holmes, B.W., Rickards, A.R. Effective diverting on horizontal wells in the Austin Chalk. 1993, SPE 265582. (14 pages).

Bellarby, J.E., Grose, T., Norris, M., Stewart, A. Design and implementation of a high rate acid stimulation through a subsea intelligent completion. 2003, SPE 83950. (10 pages).

Blinten, J.S., Aziz, R.M. Stimulating very long gross intervals. 1985, SPE 13709 (12 pages).

Brown, R.W., Neill, G.H., Loper, R.G. Factors influencing optimum ball sealer performance. Journal of Petroleum Technology. 1963, vol. Apr., pp. 450-454.

Cipolla et al., "New Algorithms and Integrated Workflow for Tight Gas and Shale Completions", SPE 146872, SPE Annual Technical Conference and Exhibition, Oct. 30-Nov. 2, 2011, 18 pages.

Cramer, D.D. Stimulating Unconventional Reservoirs: Lessons Learned, Successful Practices, Areas for Improvement. 2008, SPE-114172. (19 pages).

Doerler, N., Prouvost, L.P. Diverting agents: laboratory study and modeling of resultant zone injectivities. 1987, SPE 16250. (12 pages).

East, L.E., Bailey, J.M., McDaniel, B.W. Hydrajet Perforating and Proppant Plug Diversion in Multi-Interval Horizontal Well Fracture Stimulation: Case Histories. 2008, SPE-114881. (17 pages).

Eberhard, M.E., Meijs, R., Johnson, J. Application of flow-thru composite frac plugs in tight-gas sand completions. 2003, SPE 84328. (10 pages).

Edlund et al., "Degradable Polymer Microspheres for Controlled Drug Delivery", Advances in Polymer Science: Degradable Aliphatic Polyesters, 2002, pp. 67-112, vol. 157.

Emanuele, M.A., Miner W.A., Weijers, L., Broussard, E.J., Blevens, D.M., Taylor, B.T. A Case Study: Completion and Stimulation of Horizontal Wells with Multiple Transverse Hydraulic Fractures in the Lost Hills Diatomite. 1998, SPE-46193. (13 pages).

Erbstoesser, S.R. Improved ball sealer diversion. Journal of Petroleum Technology. 1980, vol. Nov., pp. 1903-1910.

Gabriel, G.A., Erbstoesser, S.R. The design of buoyant ball sealer treatments. 1984, SPE 13085. (12 pages).

Gall, J.W. Steam diversion by surfactants. 1985, SPE 14390. (9 pages).

Gallus, J.P., Pye, D.S. Deformable diverting agent for improved well stimulation. Journal of Petroleum Technology. Apr., 1969, SPE 2161. (8 pages).

Gallus, J.P., Pye, D.S. Fluid diversion to improve well stimulation. 1972, SPE 3811. (16 pages).

Glasbergen, G., Todd, B., Van Domelen, M., Glover, M. Design and field testing of a truly novel diverting agent. 2006, SPE 102606. (20 pages).

Hakkarainen, "Aliphatic Polyesters: Abiotic and Biotic Degradation and Degradation Products", Advances in Polymer Science: Degradable Aliphatic Polyesters, 2002, pp. 113-138, vol. 157.

Hannah, R.R. New fracturing technique leads to improved performance in the Mississippian trend. Journal of Petroleum Technology. 1976, vol. Aug., SPE 5628, pp. 859-864.

(56) References Cited

OTHER PUBLICATIONS

Harrison, N.W. Diverting Agents—History and Application. Journal of Petroleum Technology. 1972, pp. 593-598.
Hewett, T.W., Spence, C.J. Induced Stress Diversion: A Novel Approach to Fracturing Multiple Pay Sads of the NBU Field, Uintah Co., Utah. 1998, SPE-39945. (9 pages).
Hill, A.D., Galloway, P.J. Laboratory and theoretical modeling of diverting agent behavior. Journal of Petrolium Technology. 1984, vol. Jul., pp. 1157-1163.
Hu, P.C., Tuvell, M.E., Bonner, G.A. Evaluation of $\alpha$-olefin sulfonates for steam diversion. 1984, SPE 12660. (14 pages).
International Search Report and Written Opinion issued in in International Patent Appl. No. PCT/US2016/030491 dated Aug. 3, 2016; 15 pages.
Johnson, R.L., Brown, T.D. Large-Volume, High-Rate Stimulation Treatments in Horizontal Wells in the Niobara Formation, Silo Field, Laramie Country, Wyoming. 1993, SPE-25926. (14 pages).
Kamal, "Fiber Optic Sensing: Evolution to Value", SPE 167907-MS, SPE Intelligent Energy Conference and Exhibition, Apr. 1-3, 2014, 9 pages.
Kraemer et al., "A Novel Completion Method for Sequenced Fracturing in the Eagle Ford Shale", SPE 169010-ME, SPE Unconventional Resources Conference, Apr. 1-3, 2014, 10 pages.
Li, X., Wei, H., Chen, B., Liu, X., Wang, C., Zhao, X. Multi-stage fracturing stimulations improve well performance in tight oil reservoirs of the Changqing Oilfiels. 2008, IPTC 12303. (8 pages).
Lonnes, s.b., Nygaard, K.J., Sorem W.A., Hall, T.J., Tolman R.C. Advanced multizone stimulation technology. 2005, SPE 95778. (7 pages).
McDaniel, B.W., Willet, R.M. Stimulation Techniques for Low Permeability Reservoirs with Horizontal Completions that Do Not Have Cemented Casing. 2002, SPE-75688. (14 pages).
Morgenthaler, L.N., Burnett, D.B., Kie and V.D. Model wellbore evaluation of diverter effectiveness confirmed by field results. 1996, SPE 31140. (8 pages).
Nasr-El-Din, H.A., Fadhel, B.A., Al-Juaid S.K., Mohamed, S.K. Laboratory evaluation of biosealers. 2001, SPE 65017. (11 pages).
Nitters, G., Davies, D.R. Granular diverting agents selection, design and performance. 1989, SPE 18884. (8 pages).
Paccaloni, G. A new, effective matrix stimulation diversion technique. SPE Production&Facilities. 1995, vol. Aug., pp. 151-156.
Pongratz, R., Kontarev, R., Robertson, B. Optimizing matrix acid treatments in multilayered reservoir in Russia by applying different diversion techniques. 2005, SPE 94485. (15 pages).
Potapenko D.I., Tinkham, S.K., Lecerf, B., Fredd, C.N., Samuelson, M.L., Gillard, M.R., Le Calvez, J.H., Daniels, J.L. Barnett shale refracture stimulations using a novel diversion technique. 2009, SPE 119636. (11 pages).
Pritchett, J.L., Waak, K.A., Chambers, R.W., Conner, J.L. Completion of the KCC 378-H: A case study. 1992, SPE 23948, pp. 189-202.
Rees, M.J., Khallad, a., Cheng, a., Rispler, K.A., Surjaatmadja, J.B., McDaniel, B.W. Successful Hydrajet Acid Squeeze and Multifracture Acid Treatments in Horizontal Open Hole Using Dynamic Diversion Process and Downhole Mixing. 2001, SPE-71692. (13 pages).
Smith, C.L., Anderson, J.L., Roberts, P.G. New diverting techniques for acidizing and fracturing. 1969, SPE 2751. (8 pages).
Stipp, L., Williford, R.A. Pseudolimited entry: A sand fracturing technique for simultaneous treatment of multiple pays. 1967, SPE 1903. (6 pages).
Strassner, J.E., Townsend, M.A., Tucker, H.E. Laboratory/field study of oil-soluble resin-diverting agents in Prudhow Bay, Alaska, Acidizing Operations. 1990, SPE 20622. (10 pages).
Stridsberg et al., "Controlled Ring-Opening Polymerization: Polymers with designed Macromolecular Architecture", Advances in Polymer Science: Degradable Aliphatic Polyesters, 2002, pp. 41-46, vol. 157.
Surjaatmadja, J.B., McDaniel, B.W., Cheng, A., Rispler, K., Rees, M.J., Khallad, A. Successfull Acid Treatments in Horizontal Openholes Using Dynamic Diversion and Instant Response Downhole Mixing—An In-Depth Postjob Evaluation. 2002, SPE-75522. (11 pages).
Surjaatmadja, Successful Acid Treatments in Horizontal Openholes Using Dynamic Diversion and Downhole Mixing an in Depth Postjob Evaluation. 2002, SPE-75221. (10 pages).
Zimmerman, J.C., Winslow, D.W., Hinkle, R.L., Lockman, R.R. Selection of tools for stimulation in horizontal cased hole. 1989, SPE 18995. (12 pages).
Schlumberger Oilfield Glossary entries for "casing", "casing joint" and "casing string", accessed Jun. 10, 2017 via www.glossary.oilfield.slb.com (3 pages).
Schlumberger Oilfield Glossary entries for "bullheading", accessed Jun. 6, 2017 via www.glossary.oilfield.slb.com (1 page).
Schlumberger Oilfield Glossary entries for "diversion" and "chemical diversion", accessed Jun. 10, 2017 via www.glossary.oilfield.slb.com (2 pages).
Schlumberger Oilfield Glossary entries for "bridge plug", accessed Jun. 10, 2017 via www.glossary.oilfield.slb.com (1 page).
Schlumberger Oilfield Glossary entries for "spotting", accessed Jun. 6, 2017 via www.glossary.oilfield.slb.com (1 page).
International Seach Report issued in PCT/US2016/029649, dated Aug. 1, 2016, 3 pages.
International Written Opinion issued in PCT/US2016/029649, dated Aug. 1, 2016, 5 pages.
Aibertsson et al., "Degradable Aliphatic Polyesters", Advances in Polymer Science, vol. 157 2002, pp. 1-138.
International Preliminary Report on patentability issued in the related PCT Applciation PCT/US2015/041220, dated Jan. 24, 2017 (8 pages).
International Preliminary Report on patentability issued in the related PCT Applciation PCT/US2016/029649, dated Nov. 14, 2017 (6 pages).
International Preliminary Report on patentability issued in the related PCT Applciation PCT/US2016/030491, dated Nov. 14, 2017 (12 pages).

* cited by examiner

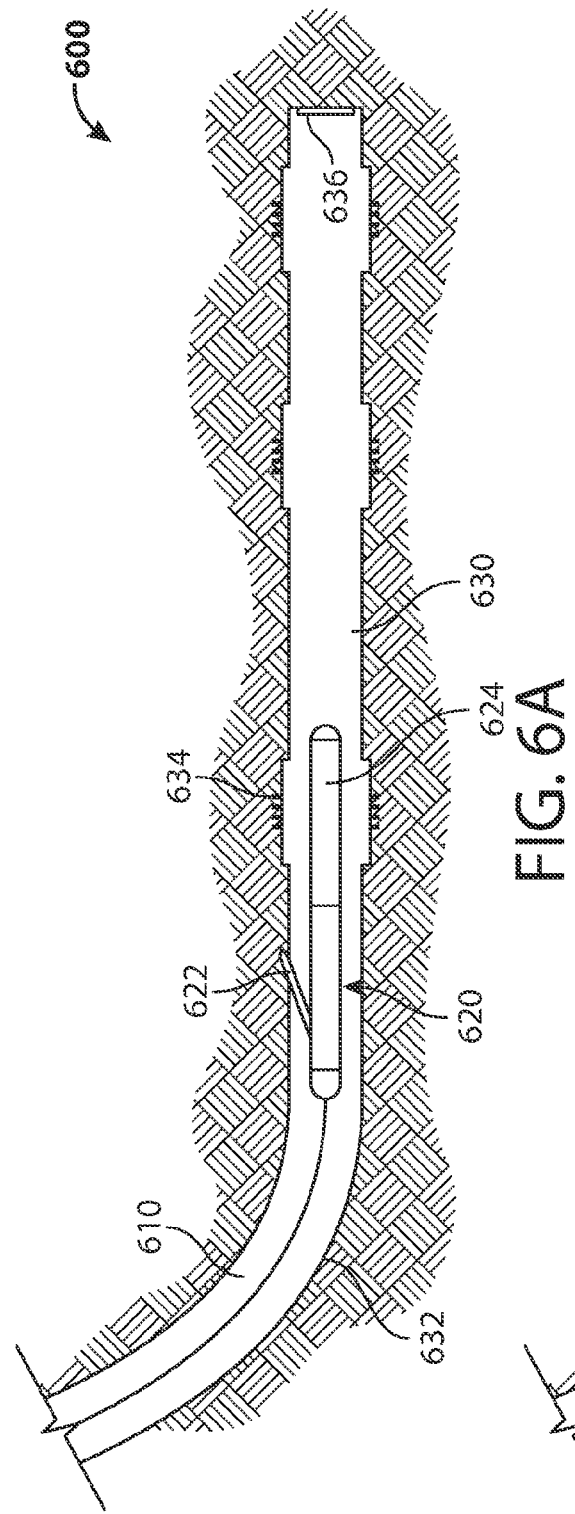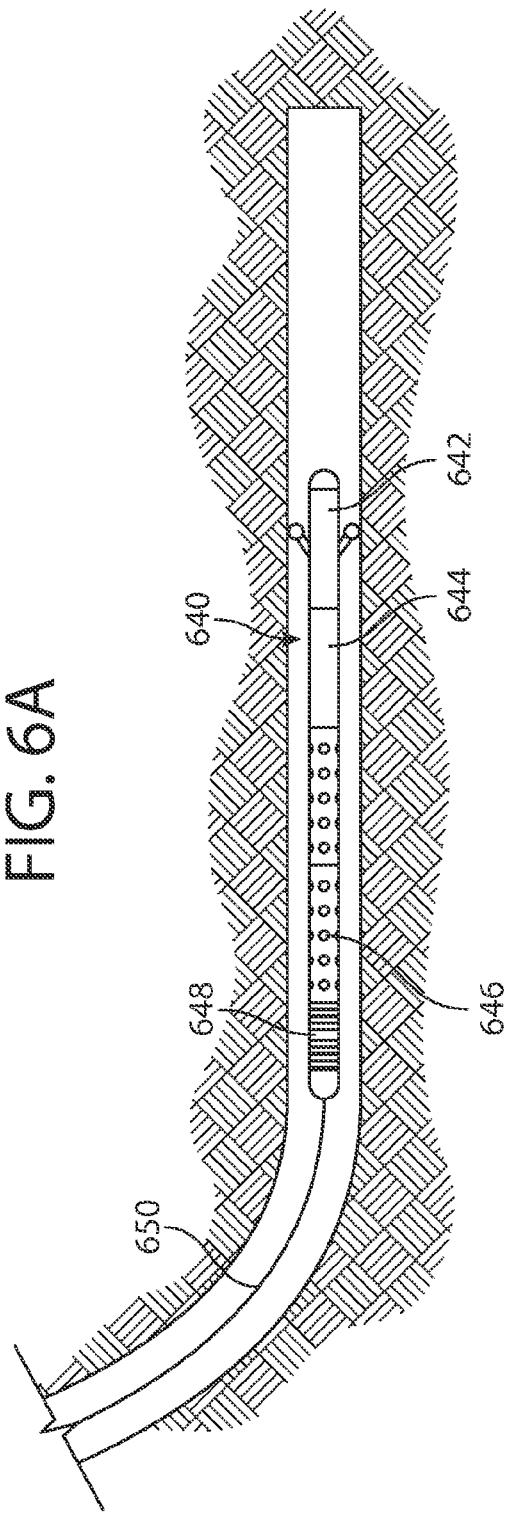

METHODS AND CABLES FOR USE IN FRACTURING ZONES IN A WELL

CROSS-REFERENCE TO RELATED APPLICATIONS

This Application claims the benefit of U.S. Provisional Patent Application No. 62/027,696 that was filed on Jul. 22, 2014 and is entitled "Methods and Cables for Use in Fracturing Zones in a Well". U.S. Provisional Patent Application No. 62/027,696 is incorporated in it entirety herein by reference.

FIELD OF THE DISCLOSURE

The disclosure generally relates to methods and cables for use in fracturing zones in a well.

BACKGROUND

Zones in a well are often fractured to increase production and/or allow production of hydrocarbon reservoirs adjacent a well. To ensure proper fracturing of zones it is useful to monitor the fracturing operations.

SUMMARY

An example cable for use in fracturing zones in a well includes a cable core. The cable core includes an optical fiber conductor. The optical fiber conductor includes a pair of half-shell conductors. An insulated optical fiber is located between the pair of half-shell conductors. The insulated optical fiber is coupled with the pair of half-shell conductors. The optical fiber conductor also includes an optical fiber conductor jacket disposed about the pair of half-shell conductors.

An example of a system for monitoring fracturing operations includes a cable. The cable comprises a cable core having an optical fiber conductor. The optical fiber conductor includes a pair of half-shell conductors. An insulated optical fiber is located between the pair of half-shell conductors. The insulated optical fiber is coupled with the pair of half-shell conductors, and an optical fiber conductor jacket is disposed about the pair of half-shell conductors. A tool string is connected with the cable, and the tool string has an anchor.

An example method of fracturing a well includes conveying a cable and tool string into a well to a first zone adjacent a heel of a horizontal portion of the well. The method also includes anchoring the cable and tool string in the well. The method also includes applying fracturing fluid to the first zone, and monitoring the fracturing by using the an optical fiber conductor of the cable to acquire cable temperature data, temperature increase and decrease data, vibration data, strain data, or combinations thereof.

BRIEF DESCRIPTION OF THE DRAWINGS

FIG. 6A depicts an example system for monitoring fracturing operations according to one or more embodiments.

FIG. 6b depicts another example system for use in well to perform operations on the well.

DETAILED DESCRIPTION

Figure 1:
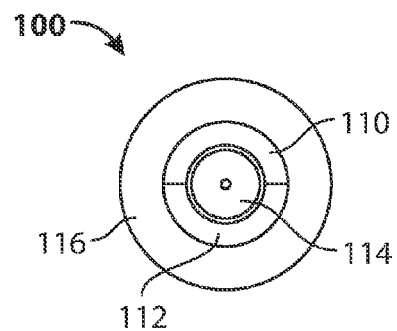
FIG. 1 depicts a schematic of an optical fiber conductor.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

An example cable for use in fracturing zones in a well includes a cable core that has an optical fiber conductor. The optical fiber conductor includes a pair of half-shell conductors. The half-shell conductors can be made from any conductive material. Illustrative conductive materials include copper, steel, or the like. The half-shell conductors can be used to provide data, power, heat or combinations thereof. The material of the conductors can be selected to accommodate the desired resistance of the cable. The half-shell conductors can be used to provide heat, and the heating of the cable can be controlled by selective adjustment of current passing through the half-shell conductors.

An insulated optical fiber is located between the pair of half-shell conductors. The insulated optical fiber can be insulated with a polymer or other insulating material. The insulated optical fiber can be coupled with the pair of half-shell conductors. For example, the insulation of the optical fiber can be bonded with the optical fiber and the inner surfaces of the half-shell conductors. Coupled as used herein can mean physically connected or arranged such that stress or force applied to the half-shell conductors is also applied to the optical fiber. For example, the space between the insulated optical fiber and the half-shell conductors can be minimal to allow coupling of the insulated optical fiber and half-shell conductors. The optical fiber can be a single optical fiber or a plurality of optical fibers. The optical fiber can be a bundle of optical fibers.

An optical fiber conductor jacket can be disposed about the pair of half-shell conductors. The optical fiber conductor jacket can be made from polymer or other materials.

An example cable core can also include a plurality of optical fiber conductors and cable components located in interstitial spaces between the plurality of optical fiber conductors. The cable components can be glass-fiber yarn, polymer, polymer covered metal tubes, composite tubes, metal tubes, or the like. A central cable component can be located between the plurality of optical fiber conductors. In one or more embodiments, a non-conductive material can be located in the cable core to fill void spaces therein.

A foamed-cell polymer, a core jacket, an outer jacket, or combinations thereof can be located about the cable core.

The core jacket can be a polymer, a fiber reinforced polymer, a cabling tape, or combinations thereof.

In one or more embodiments, a seam-weld tube can be located about an outer jacket. The seam-welded tube can at least partially embed into the outer jacket.

FIG. 1 depicts a schematic of an optical fiber conductor. The optical fiber conductor 100 has a first half-shell conductor 110, a second half-shell conductor 112, an insulated optical fiber 114, and an optical fiber conductor jacket 116.

Figure 2:
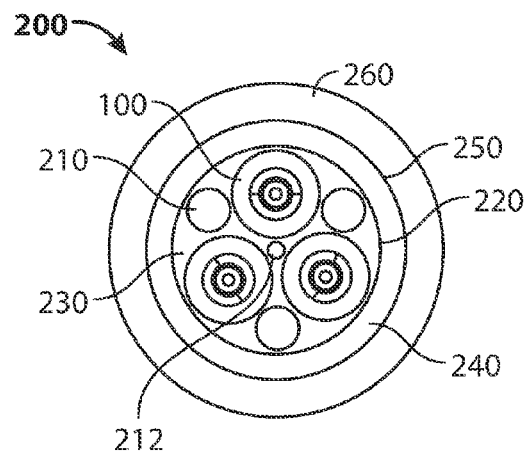
FIG. 2 depicts a cable for use in fracturing operations according to one or more embodiments.

FIG. 2 depicts a cable for use in fracturing operations according to one or more embodiments. The cable 200 includes a plurality of optical fiber conductors 100, a plurality of cable components 210, a core jacket 220, a non-conductive material 230, a foamed-cell polymer 240, an outer jacket 250, and a seam-welded tube 260.

The plurality of optical fiber conductors 100 and the plurality of cable components 210 are cabled about a central cable component 212. The non-conductive material 230 is used to fill spaces or voids in the cable core during cabling. The core jacket 220 is extruded or otherwise placed about the plurality of optical fiber conductors 100, the cable components 220, the central cable component 212, and the non-conductive material 230.

The foamed-cell polymer 240 is placed about the core jacket 220, and an outer jacket 250 is placed about the foamed-cell polymer 240. A seam-welded tube 260 is placed about the outer jacket 250. The seam-welded tube 260 can at least partially embed into the outer jacket 250. For example, a weld bead can embed into the outer jacket 250.

The cable 200 can be connected to a downhole tool and can be arranged to heat and power delivery. For example, a power source at surface can be connected with two of the optical fiber conductors 100, such that one is positive and the other is negative, the third can be used for grounding or floating. The paths can be in a series loop for heating application, and when power needs to be delivered to downhole tools a switch can open the series conductor path and connect each path to designated tool circuit for power delivery.

The self-heating and power supply can be performed concurrently. For example, one conductor can be connected to positive terminal at a power supply at surface and to a designated tool circuit downhole, and another conductor can be connected to a negative terminal at the surface and to a designated tool circuit downhole. Accordingly, power can be delivered downhole and one of the conductor paths can be a return; in one embodiment, if the downhole tool is a tractor, the tractor can be stopped and the wheels closed allowing power to be delivered without movement and at same time the self-heating can occur.

Figure 3:
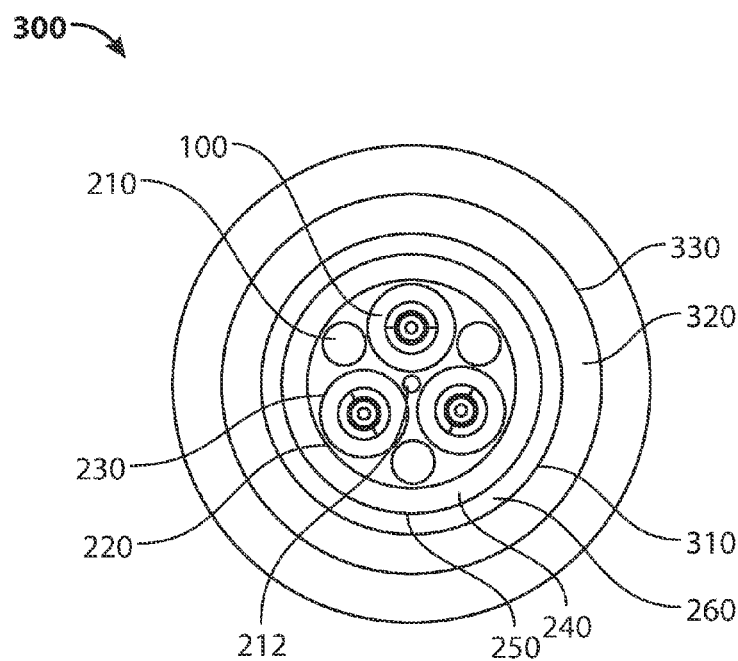
FIG. 3 depicts a schematic of another cable for use in fracturing operations according to one or more embodiments.

FIG. 3 depicts a schematic of another cable for use in fracturing operations according to one or more embodiments. The cable 300 includes the plurality of optical fiber conductors 100, the plurality of cable components 210, the center component 212, the core jacket 220, the non-conductive material 230, the foamed-cell polymer 240, the outer jacket 250, the seam-welded tube 260, a reinforced jacket 310, an additional jacket 320, and an additional seam-welded tube 330.

Figure 4:
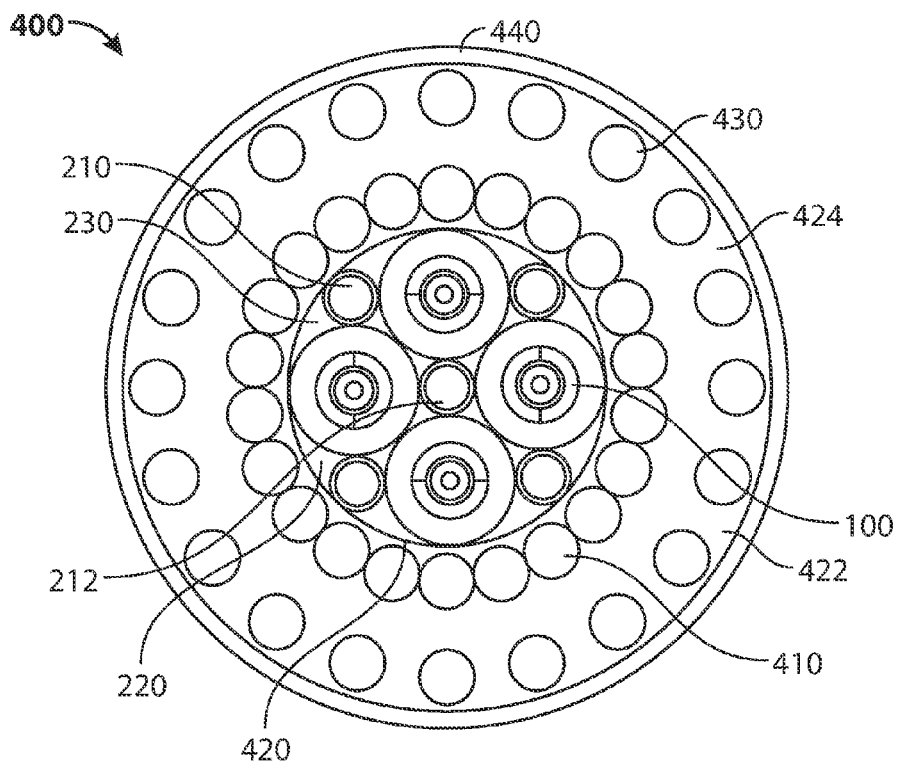
FIG. 4 depicts a schematic of a cable for use in fracturing operations according to one or more embodiments.

FIG. 4 depicts a schematic of a cable for use in fracturing operations according to one or more embodiments. The cable 400 includes a plurality of optical fiber conductors 100, the plurality of cable components 210, the core jacket 220, a first jacket 420, a first layer of strength members 410, a second jacket 422, a second layer of strength members 430, a third jacket 424, and a reinforced outer jacket 440.

The plurality of optical fiber conductors 100 and the plurality of cable components 210 can be cabled about the central component 212. The non-conductive material 230 is used to fill spaces or voids in the cable core during cabling. A core jacket 220 is extruded or otherwise placed about the plurality of optical fiber conductors 100, the cable components 220, the central cable component 212, and the non-conductive material 230. A first jacket 420 can be placed about the cable core jacket 220. The first jacket 420 can be a reinforced polymer, a pure polymer, or the like.

The first layer of strength members 410 can be cabled about the first jacket 420. The first layer of strength members 410 can at least partially embed into the first jacket 420. A second jacket 422 can be placed about the first layer of strength members 410. The second jacket 422 can at least partially bond with the first jacket 420. A second layer of strength members 430 can be cabled about the second jacket 422. The second jacket 422 can separate the first layer of strength members 410 from the second layer of strength members 430 from each other. The strength members in the first strength member layer and the second strength member layer can be coated armor wire, steel armor wire, corrosion resistant armor wire, composite armor wire, or the like.

A third jacket 424 can be placed about the second layer of strength members 420. The third jacket 424 can bond with the second jacket 422. A reinforced outer jacket 430 can be placed about the third jacket 424.

The quad type cable can be connected to a tool string using a 1 by 1 configuration, a 2 by 2 configuration, or a 3 by 1 configuration. For example, a series loop can be formed by connecting two conductors to positive and two conductors to negative in a closed loop and a switching device can be used to open the loop and connect with the downhole tools. In another configuration two of the conductors can be looped for heat generation and two of the conductors can be connected to the downhole tools for power deliver; if the downhole tool is a tractor, the tractor can be stopped and the wheels closed allowing power to be delivered without movement and at same time the self-heating can occur.

In one example, two conductor paths can be connected to power at surface and a third to negative at surface, and each of the conductors can be connected to designated tool circuits downhole for power delivery using one of the conductive paths as a return.

Figure 5:
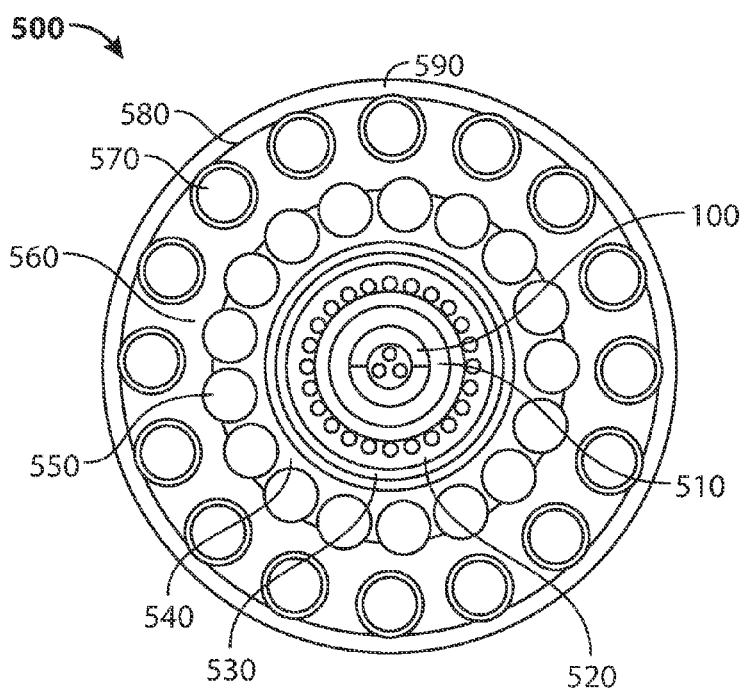
FIG. 5 depicts a schematic of a cable for use in fracturing operations according to one or more embodiments.

FIG. 5 depicts cable according to one or more embodiments. The cable 500 includes one or more optical fiber conductors 100, a double jacket 510, wires 520, an insulating layer 530, a first jacket 540, a first layer of strength members 550, a second jacket 560, a second layer of strength members 570, a third jacket 580, and an outer jacket 590.

The optical fiber conductor 100 has the double jacket 510 located thereabout. The double jacket can include two polymers of differing strength. The wires 520 can be served helically over the double jacket 510. The insulating layer 530 can be placed about the wires 520. The insulating layer can be a polymer or like material. The first jacket 540 can be placed about the insulating layer. The first jacket 540 can be a fiber reinforced polymer.

The first strength member layer 540 can be cabled about the first jacket 540. The first strength member layer 540 can at least partially embed into the first jacket 540. The second jacket 560 can be placed about the first strength member layer 540. The second jacket 560 can bond with the first jacket 540.

The second layer of strength members 570 can be cabled about the second jacket 560, and the second layer of strength members 570 can at least partially embed into the second jacket 560.

The third jacket 580 can be placed about the second layer of strength members 570. The third jacket 580 can bond with the second jacket 560. The outer jacket 590 can be placed about the third jacket 580. The outer jacket 580 can be a fiber reinforced polymer.

FIG. 6A depicts an example system for monitoring fracturing operations according to one or more embodiments. The system 600 includes a cable 610 and a tool string 620. The tool string 620 includes an anchoring device 622 and a logging tool 624. The cable 610 can be any of those disclosed herein or a cable having an optical fiber conductor as described herein. The anchoring device 622 can be a centralizer, a spike, an anchor, or the like. The tool string 620 can have a flow meter and a tension measuring device.

The cable 610 and tool string 620 can be conveyed into a wellbore 630. The wellbore 630 has a heel 632, a plurality of zones 634, and a toe 636. The cable 610 and tool string 620 can be conveyed into the wellbore 630 using any method of conveyance, such as pump down, tractors, or the like. The tool string 620 can be stopped adjacent a first zone adjacent the heel 632. Fracturing fluid can be pumped into the well to open the zone, and the cable 610 can be used to monitor the fracturing operation. After fracturing, diverter fluid can be provided to the well to plug the fractures. The tool string and cable can be conveyed further into the well towards the toe 636 and stopped at intermediate zones. At each of the zones the fracturing operations and diverting can be repeated.

Once all zones are fractured, the plugged fractures can be unplugged. The plugged fractures can be unplugged using now known or future known techniques. The tool string 620 and cable 610 can be left in the wellbore and the zones can be produced, and the logging tool 624 can be used to acquire data. In one or more embodiments, the logging tool 624 can acquire data before the zones are fractured, as the zones are fractured, after the zones are fractured, or combinations thereof.

FIG. 6b depicts another example system for use in well to perform operations on the well. The system includes a tool string 640. The tool string 640 includes a tractor 642, a logging tool 644, and a plug 648. The tool string 640 can include other equipment to perform additional downhole services. The downhole services can include intervention operations, completion operations, monitoring operations, or the like. A cable 650 can be connected with the tool string 640. The cable 650 can be any of those disclosed therein or substantially similar cables.

Figure 7:
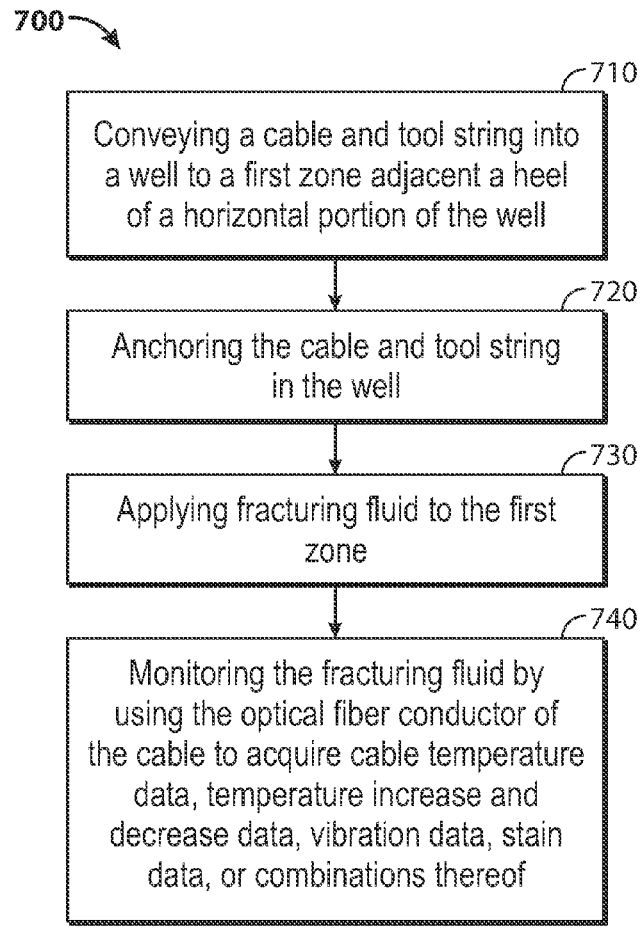
FIG. 7 depicts an example method of fracturing zones in a well according to one or more embodiments.

FIG. 7 depicts an example method of fracturing zones in a well according to one or more embodiments.

The method 700 includes conveying a cable and tool string into a well to a first zone adjacent a heel of a horizontal portion of the well (Block 710). As the cable and tool string are conveyed into the well, the tension on the cable and the flow of fluid can be measured. Fluid flow and cable tension can predict the cable status. For example, if a high flow rate is measured but the cable loses tension, it would indicate the cable is buckling or stuck downhole; if the cable is under tension and low or no flow is detected, the fractures before the cable anchoring mechanism are taking most of the fluid; if the cable is under tension and high flow rate is measured it would indicate that there are no open fractures before the cable anchoring mechanism and the cable should be moving towards the toe of the well. The fluid flow can be measured using a flow meter in the tool string or the self-heated capability of the cable can be used to predict the flow velocity around the cable based on the rate of increase or decrease of the temperature using distributed temperature sensing.

The method can also include anchoring the cable and tool string in the well (Block 720). The method can also include applying fracturing fluid to the first zone (Block 730).

The method also includes monitoring the fracturing by using an optical fiber conductor of the cable to acquire cable temperature data, temperature increase and decrease data, vibration data, strain data, or combinations thereof (Block 740). The hydraulic fracturing process is monitored using the heat-enabled fiber-optic cable. Real-time measurements of cable temperature, temperature increase or decrease rate, vibration, and strain measurements are available to predict which fracture is taking more fluid.

Operations above can be repeated for each zone. Cable tension measurement and fluid flow can be monitored after each zone to prevent damage to the cable.

Figure 8:
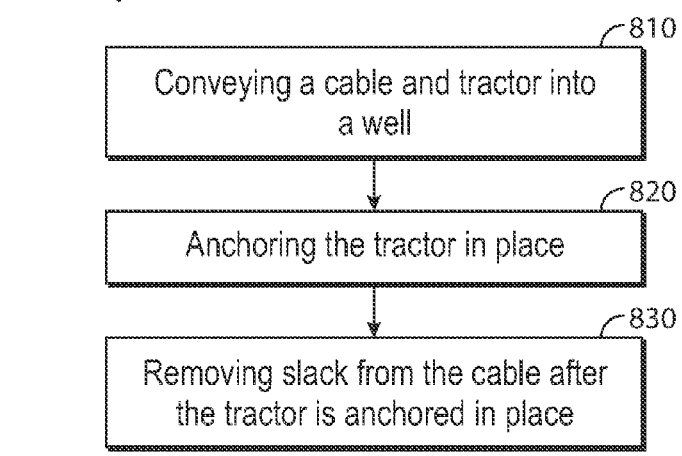
FIG. 8 depicts an example method of placing a cable in well for monitoring.

FIG. 8 depicts an example method of placing a cable in well for monitoring. The method 800 includes conveying a cable and tractor into a well (Block 810). The conveying can be performed using pump down, a tractor, gravity, other known or future known methods, or combinations thereof.

Once the tractor and at least a portion of the cable or located at a desired location in the well, the method can include anchoring the tractor in place (Block 820). The tractor can be anchored in place using anchoring spikes, anchoring pads, or the like.

The method can also include removing slack from the cable after the tractor is anchored in place (Block 830). The slack can be removed from the cable by pulling at the surface or using other known or future know techniques.

The method can also include monitoring the well conditions, operation parameters, or combinations thereof. The monitoring can include hydraulic fracturing monitoring, detecting leaks in a casing, gas production, oil production, electrical submersible pump monitoring, gas lift mandrel monitoring, injection water breakthrough, cross flow shut-in, gas breakthrough, injection profile of water injection wells, steam injection monitoring, $CO_2$ injection performance, zonal isolation monitoring, monitoring for flow behind casing, or other temporary or permanent monitoring operations. The cable can acquire data to aid in fracture height determination, zonal flow contribution determination, evaluation of well stimulation, optimization of gas lift operations, optimization of electrical submersible pumps, other wellbore data, operation data, or production data, or combinations thereof.

The monitoring can be performed in any type of well. Illustrative wells include subsea wells, vertical wells, and horizontal wells. The monitoring can be permanent monitoring or temporary monitoring.

Figure 9:
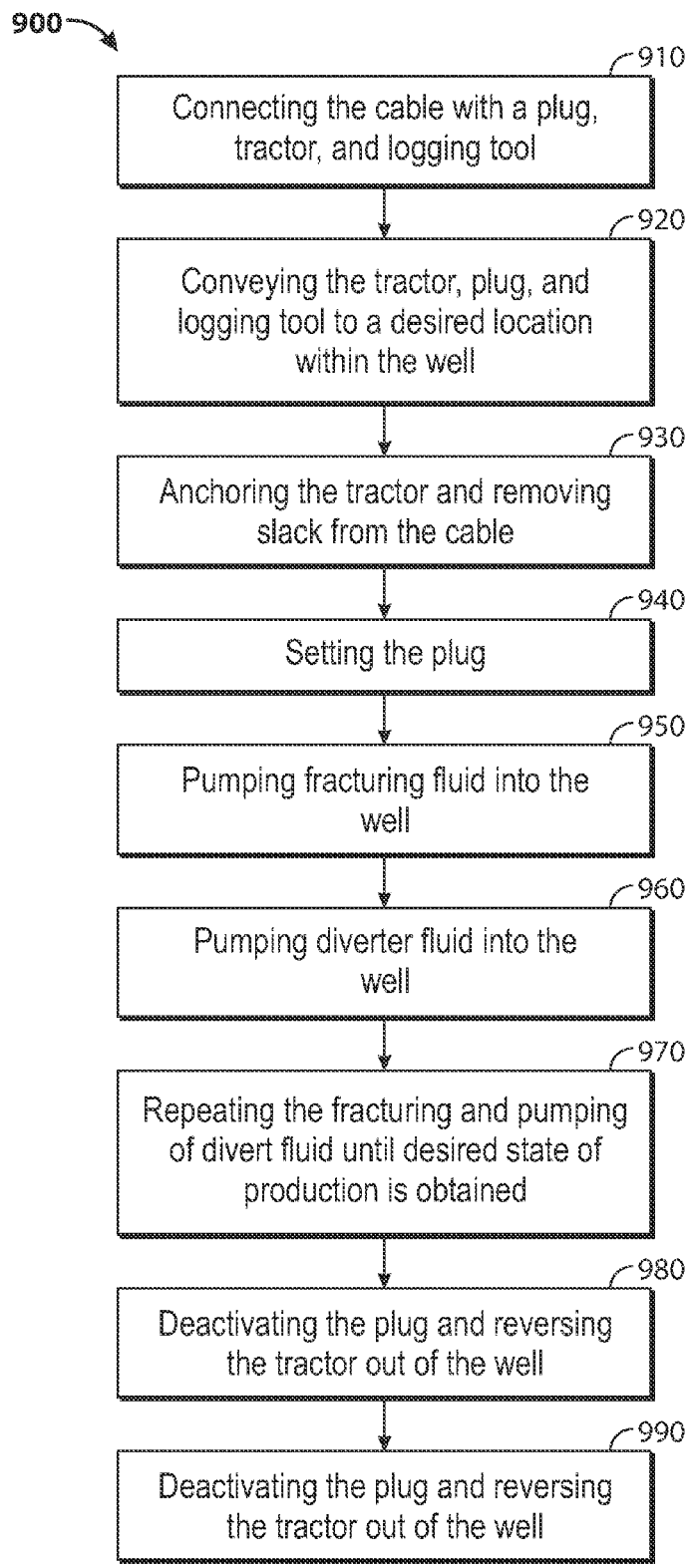
FIG. 9 depicts an example method of placing a cable in a well for hydraulic fracturing and logging in a horizontal well.

FIG. 9 depicts an example method of placing a cable in a well for hydraulic fracturing and logging in a horizontal well. The method 900 includes connecting the cable with a plug, tractor, and logging tool (Block 910). The plug can be a packer or other sealing device. The tractor can be battery operated or powered by the cable.

The method 900 also includes conveying the tractor, plug, and logging tool to a desired location within a well (Block 920). The desired location can be any location in the well. The desired location can be at the toe of a horizontal portion of the well, within an intermediate location of a horizontal portion of the well, or any other portion of the well.

The method also includes anchoring the tractor and removing slack from the cable (Block 930). The method also includes setting the plug (Block 940). The plug can isolate the tractor and logging tool from pressure in the well, corrosive fracturing fluids, or other wellbore condition uphole of the tractor and logging tool. The method includes pumping fracturing fluid into the well (Block 950). The method also includes monitoring the fracturing operation using the cable (Block 960). The monitoring can include obtaining real-time measurements of cable temperature, temperature increase or decrease, vibration, strain measurement, or other parameters.

The method also includes pumping diverter fluid into the well (Block 950). The method also includes repeating the fracturing and pumping of divert fluid until desired state of production is obtained (Block 970). The method also includes deactivating the plug and reversing the tractor out of the well (Block 980). The method also includes logging with the logging tool as the tractor is reversed out of the well (Block 990).

In one or more embodiments of the method, the method can also include monitoring production with the cable as the tractor is reversed out of the well.

In one or more embodiments of the methods disclosed herein the cable can be connected with the tractor, a perforating gun, a logging tool, or combinations thereof. For example, the cable can be connected with a perforating gun and tractor, and the perforating gun can be used to perforate the well before the well is fractured. In another example, the cable can be connected with a perforating gun, tractor, logging tool, and a plug. The well can be perforated, the plug can be set, fracturing operations carried out, and logging can be performed as the tractor is reversed out of the well. Of course, other combinations of downhole hole equipment can be added to the tool string allowing for real-time monitoring using the cable and performance of multiple operations to be performed on a well in a single trip.

Figure 10:
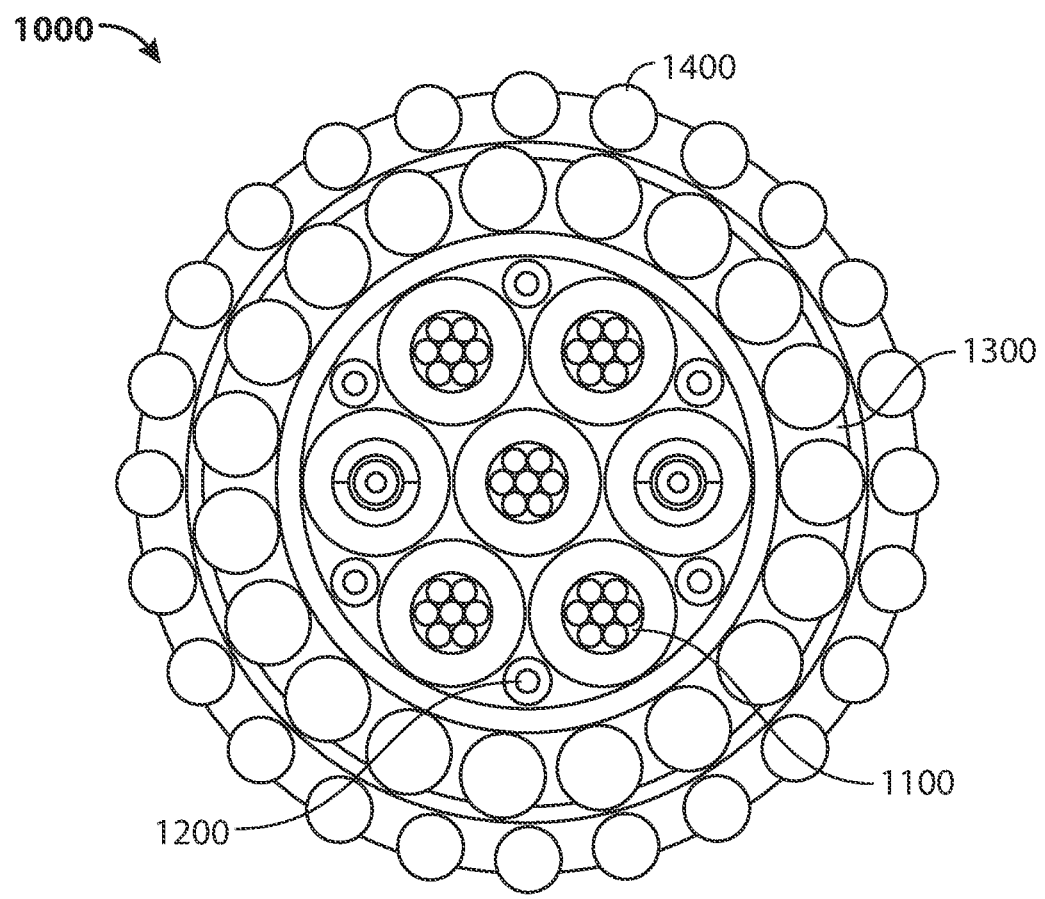
FIG. 10 depicts an example cable with a hepta core for monitoring in a well.

FIG. 10 depicts an example cable for monitoring in a well. The cable 1000 can include a cable core that includes a plurality of conductors 1100 and a plurality of cable components 1200. The conductors 1100 can be any conductor. Illustrative conductors include stranded conductors, fiber optic conductors, other conductors described herein, other know or future known conductors, or combinations thereof. The cable components 1200 can be filler rods, incompressible polymer rods, metallic rods, other now known or future known components, or any combination thereof.

The cable core can have a first armor layer 1300 and a second armor layer 1400 disposed thereabout. The armor layers 1300 and 1400 can include any number of armor wires. The armor layers can be filled with polymer, and the polymer in each armor layer can be bond together. In one or more embodiments, a jacket or the like can separate the first armor layer 1300 from the second armor layer 1400.

For a hepta cable the cable can be connected with the downhole tool in surface power supply using a 3 by 3 configuration. Three conductors can be used for power delivery and 3 conductors can be used for heating. Other configuration can be used. For example, all conductors can be used for heating by connecting in loop, where three conductors are connected to positive of power supply and three conductors are connected to negative of the power supply, and at the tool string a switch can be used to open the loop and connect the conductors to the a designated circuit for power delivery.

In another embodiment, power delivery and heating can be done at the same time. For example, three conductors can be connected to positive at the surface and three conductors can be connected to negative at surface, two or more conductors can be in series for heating application, and the remaining conductive paths can connected to designated tool circuit for power delivery using one conductive path as the return; and when the tractor is stopped the wheels can be retracted allowing for power delivery while avoiding movement.

The cables disclosed herein can be connected with downhole tools and surface power in various ways allowing for continuous power delivery and heating, selective power delivery and heating, or combinations thereof. The connections can be made using now known or future known techniques. The connections can include switches, microprocessors, or other devices to control power delivery and heating.

Although example assemblies, methods, systems have been described herein, the scope of coverage of this patent is not limited thereto. On the contrary, this patent covers every method, nozzle assembly, and article of manufacture fairly falling within the scope of the appended claims either literally or under the doctrine of equivalents.

What is claimed is:

1. A cable for monitoring downhole fracturing operation, comprising:
    a. an optical fiber conductor comprising two shaped wires and at least one optical fiber located therein, wherein the optical fiber is coupled with the two shaped wires;
    b. a double jacket, comprising two polymers of differing strength;
    c. inner wires helically wound about the double jacket;
    d. an insulation layer disposed about the inner wires;
    e. a first jacket disposed about the insulating layer;
    f. a first layer of strength members disposed about the first jacket;
    g. a second jacket disposed about the first layer of strength members;
    h. a second layer of strength members disposed about the second jacket; and
    i. an outer jacket disposed about the second layer of strength members.

2. The cable of claim 1, wherein the first jacket is a fiber reinforced polymer.

3. The cable of claim 1, wherein the outer jacket is a fiber reinforced polymer.

4. The cable of claim 1, wherein the second layer of strength members is at least partially embedded into the second jacket.

5. The cable of claim 1, wherein the first layer of strength members is at least partially embedded into the first jacket.

6. The cable of claim 1, wherein the two shaped wires are used to provide data, power, heat or combinations thereof.

* * * * *